Oct. 14, 1924.

C. STEEN

CAN SOLDERING MACHINE

Filed Oct. 3, 1923

Inventor.
Carl Steen.
By [signature] Atty.

Oct. 14, 1924.                          1,511,686
C. STEEN
CAN SOLDERING MACHINE
Filed Oct. 3, 1923          5 Sheets-Sheet 3

Inventor
Carl Steen.
By. [signature] Atty.

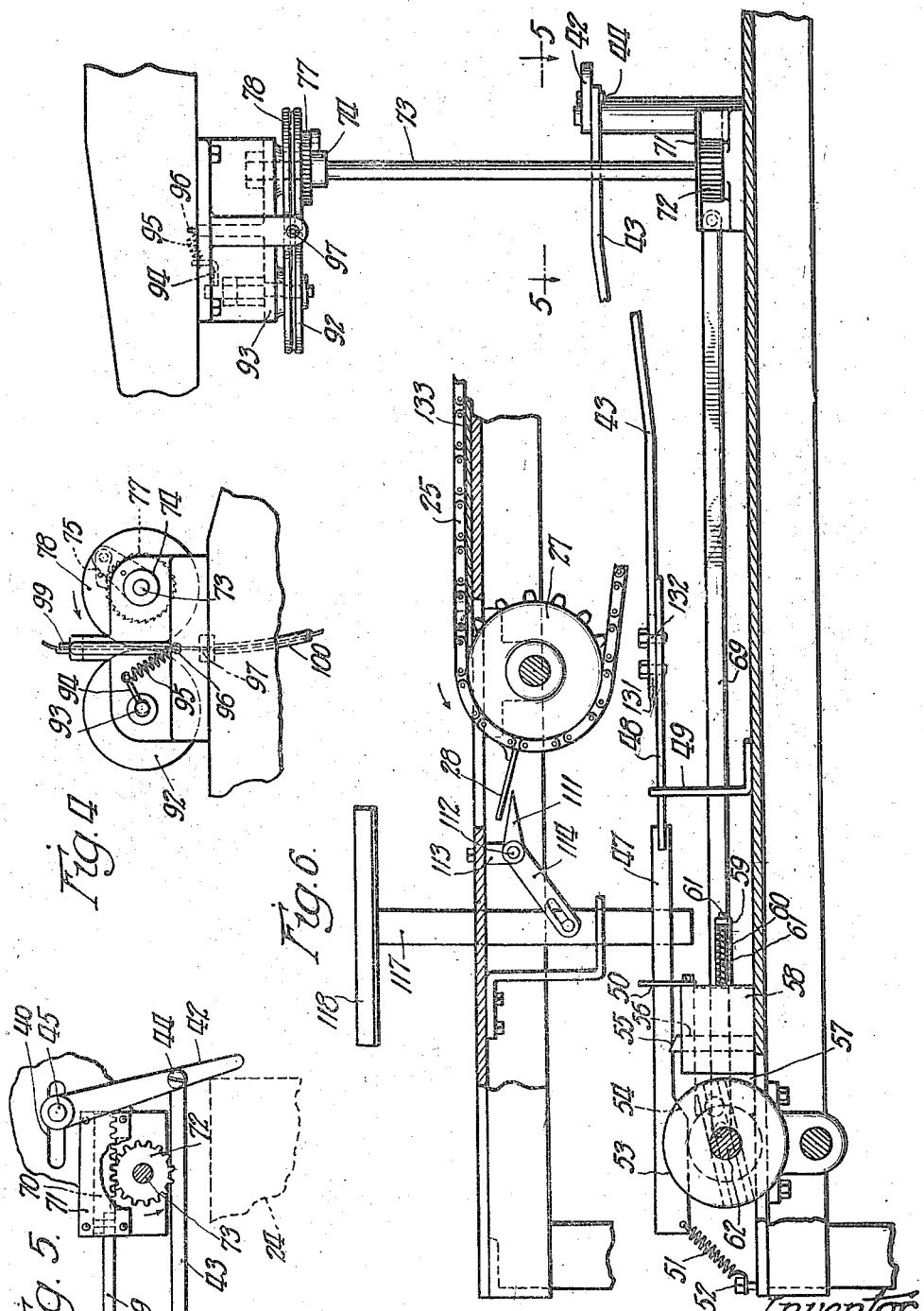

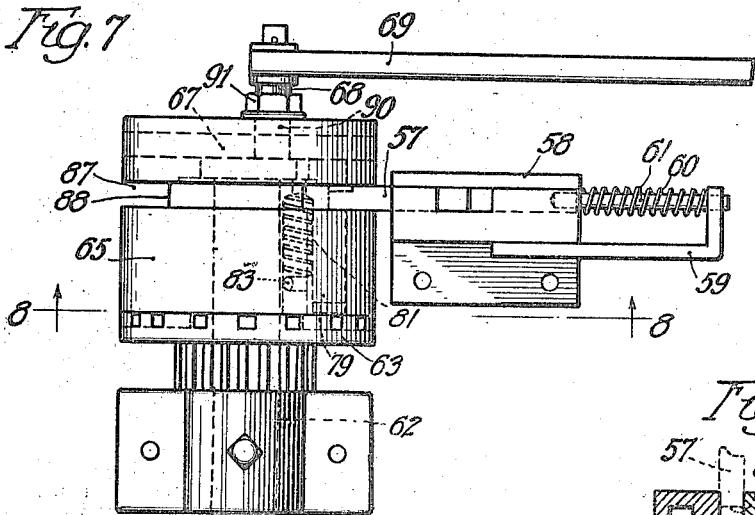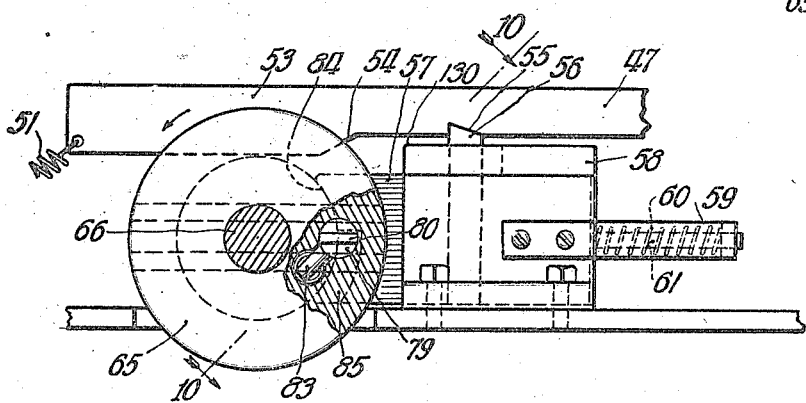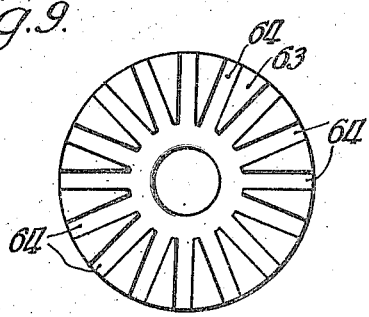

Patented Oct. 14, 1924.

1,511,686

UNITED STATES PATENT OFFICE.

CARL STEEN, OF CHICAGO, ILLINOIS.

CAN-SOLDERING MACHINE.

Application filed October 3, 1923. Serial No. 666,318.

*To all whom it may concern:*

Be it known that I, CARL STEEN, a citizen of the United States, residing at Chicago, in the county of Cook and State of Illinois, have invented a certain new and useful Improvement in Can-Soldering Machines, of which the following is a full, clear, concise, and exact description, reference being had to the accompanying drawings, forming a part of this specification.

My invention relates to can soldering machies and more particularly to a machine for soldering the side seams of square cans.

It is a purpose to provide new and improved means for soldering the side seams of square cans, comprising a plurality of soldering irons arranged in a row so that said soldering irons will successively act on the seam to solder the same, said soldering irons being preferably detachably mounted on the machine.

It is another purpose of the invention to provide means for cooling the can at the seam so as to permit inverting the same to a position so that the seam diametrically opposite the one that has been soldered can be soldered immediately after said first seam has been soldered.

It is a further purpose of the invention to provide means for inverting said cans to the second mentioned position.

It is another purpose of the invention to provide new and improved means for feeding solder to the soldering irons and to the seam, whereby the cans actuate the feeding mechanism to feed a predetermined length of solder into position adjacent the seam and adjacent the first soldering iron of the row.

Other objects and advantages of the invention will appear as the description of the accompanying drawings proceeds.

However, I desire to have it distinctly understood that I do not intend to limit myself to the exact details shown or described, but that I intend to include as part of my invention all such obvious changes and modifications of parts as would occur to a person skilled in this art and as would fall within the scope of the claims.

In the drawings:

Fig. 4 is a detail plan view of the solder feeding rolls;

Fig. 5 is a detail plan view similar to Fig. 4 of the actuating means for said solder feeding device;

Fig. 6 is a fragmentary side elevation of a portion of the conveyor and the solder feeding mechanism;

Fig. 7 is a detail plan view of the devices shown in the lower left hand corner of Fig. 6;

Fig. 8 is a side view partly in section of the devices shown in Fig. 7, taken substantially on the line 8—8 of Fig. 7;

Fig. 9 is a face view of the clutch plate used in the solder feeding device; and Fig. 10 is a fragmentary transverse sectional view of the clutch device taken on the line 10—10 of Fig. 8.

Figure 1:
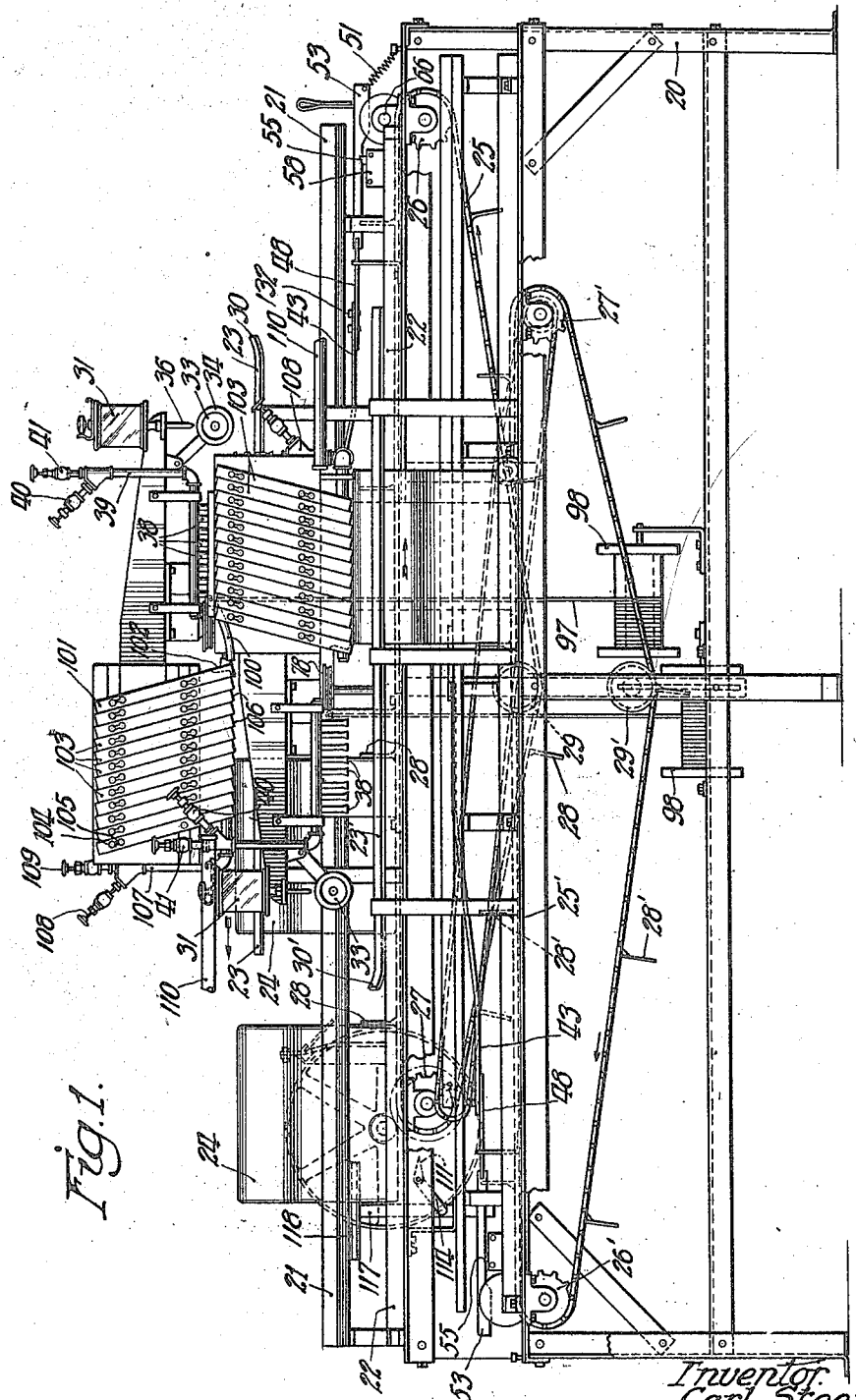
Fig. 1 is a side elevation of my improved soldering machine.

Referring in detail to the drawings, the machine comprises a framework 20 which is provided with guides 21, 22 and 23 for guiding the cans 24, said cans 24 being fed into the machine on a conveyor comprising a sprocket chain 25 operating over sprockets 26 and 27 at opposite ends of the framework, said sprocket chain being provided with flights or pusher members 28 which engage with the cans 24 to move the same through the machine and operating in a guide channel 133.

Figure 3:
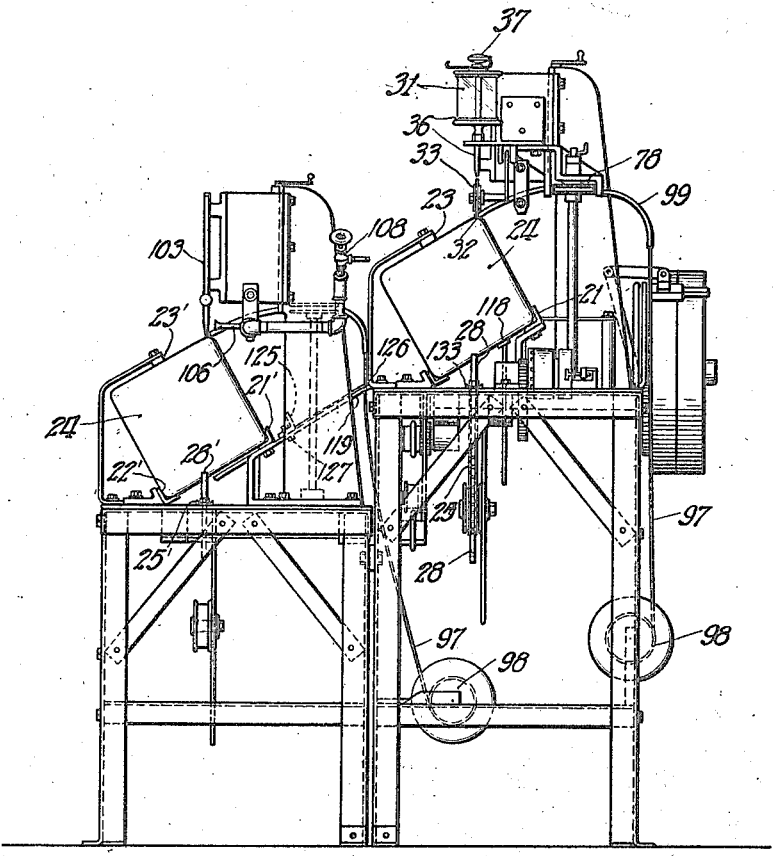
Fig. 3 is an end view looking at the machine from the right hand end in Fig. 1.

It will be noted from Fig. 3 that the framework is provided with a higher and a lower portion and that a set of guides 21′, 22′ and 23′, similar to the guides 21, 22 and 23, is provided on the lower portion of said framework while the guides 21, 22 and 23 are on the higher portion of the framework. A sprocket chain 25′ is provided for moving the cans 24 along said lower guideways and is provided with flights 28′ for pushing the cans along said guideways, said conveyor moving in the opposite direction to the upper conveyor, the said chain 25′ operating over the sprockets 26′ and 27′ in a similar manner to that in which the chain 25 operates over the sprockets 26 and 27. The upper conveyor is provided with a sprocket 29 and the lower conveyor with a sprocket 29′ for holding the lower runs of the conveyors spaced from the upper runs thereof. The guideways 23 and 23′ are provided with upturned ends 30 and 30′ respectively at the can receiving ends thereof.

As will be noted from Figs. 1 and 3, a flux containing cup 31 is provided above the guideway 23 and the can 24 projects above said guideway so that the upper corner 32 thereof will engage with the roller 33 having a felt covering 34 thereon and swingingly mounted on the framework by means of the link connection 35. The flux chamber or cup 31 is provided with a downwardly extending spout or nozzle 36 from which the flux drips on the felt pad on the roller 33 from which the flux is transferred to the can at the corner 32 thereof as the roller rolls over the surface of said can. The flux feeding member 31 operates in a similar manner to an oil cup and is provided with an adjusting device 37 thereon for regulating the flow of the flux through the outlet 36. The engagement of the roller 33 with the can is due solely to the action of gravity as the can passes under the same.

After passing under the flux feeding roller 33 the can is moved along under a heating device for heating the seam at the point where soldering is to take place. The edges of the material are, of course, folded together as is customary at the seam, before the can is fed into the soldering machine, in any well known manner. Said heating device comprises a plurality of gas burners 38 each of which throws a flame downwardly on the seam of the can, said burners being supplied with gas and compressed air through the pipe 39, the supply being controlled by means of the gas valve 40 and compressed air valve 41.

Figure 2:
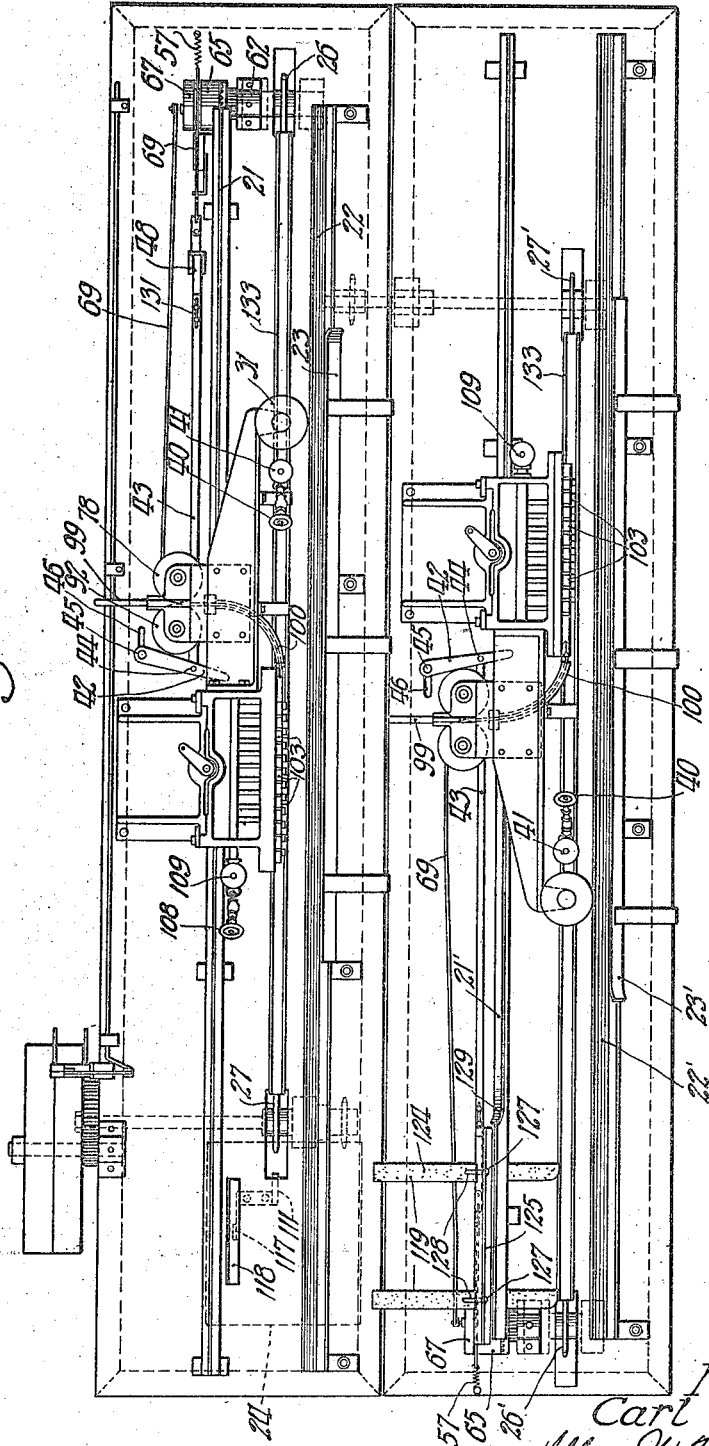
Fig. 2 is a plan view thereof.

After the seam has been heated the can passes onward under the plurality of soldering irons, a piece of solder being fed to the seam at the first soldering iron. The solder feeding means is actuated by the cans as they move into engagement with a finger which controls the solder feeding means. Said finger is located between the heating means and the soldering irons in the path of the cans and is indicated in Fig. 2 by the numeral 42. Said finger is in the form of a lever pivoted to a link 43 at 44 and having a pin 45 on the end thereof operating in a slot 46 in the framework.

As will be readily seen from the drawings, there are two sets of devices, one associated with the conveyor comprising the chain 25 and the other associated with the conveyor comprising the chain 25'. Said devices are exactly the same except that they are arranged in reverse order and the same numerals are applied to both sets of devices. Each comprises the flux feeding means, the heating means, the solder feeding means and the soldering means and, in addition, a cooling device after the can passes the soldering means. The details of the solder feeding mechanism are shown as they would appear in the lower portion of Fig. 2 and in the lower portion of Fig. 1. That is, the details thereof, as shown in Figs. 4 to 10 inclusive, are arranged in the relationship which they would have when associated with the conveyor 25' which is the reverse from the relationship shown in the upper portion of Fig. 2 in conjunction with the conveyor 25.

In Fig. 5 a can 24 is shown as engaging with the member 42 and from Fig. 6 it will be seen that the member 43 is connected with a bar 47 by means of the link 48, said link 48 being guided by means of the guide bracket 49 and the bar 47 being guided in its movement by means of the guide plate 50. The rear end of the bar 47 is provided with a coil spring 51 anchored to the framework at 52 which tends to pull the bar to the left in Fig. 6. The action of the can 24 is to move the rod 43 to the right in Fig. 6. Thus the spring 51 tends to retract the parts to their original position after a can has acted on the member 42.

The bar 47 is provided with a widened portion 53 connected with the lower portion thereof by means of an inclined portion 54, forming a beveled shoulder, and which is provided with a beveled notch 55. A locking pin or bolt 56 is adapted to enter the beveled notch 55. These parts are shown more in detail in Fig. 8. The member 56 is mounted on a slidable plate 57 mounted for sliding movement in the housing 58. It will be seen that the plate 57 will be carried with the member 47, due to engagement of the locking pin 56 in the notch 55 when the member 43 is moved to the right in Figs. 6 and 8. A bracket 59 is provided on the housing 58 and a coil spring 60 extends between said bracket and the plate 57 and surrounds a rod or pin 61 projecting endwise from said plate. The spring 60 will be compressed when the parts are moved to the right in Figs. 6, 7 and 8 and said spring will tend to return the plate 57 to its original position.

Mounted on the shaft 62, which is constantly rotated with the other rotating parts by any suitable driving connection, is a clutch plate 63. The clutch plate 63 is provided with a plurality of radially extending grooves 64 as shown in Fig. 9. Co-operating with said clutch plate 63 is a clutch member 65 from which the shaft 66 extends, said shaft having an eccentric 67 mounted thereon to rotate therewith which is provided with a short shaft or pin 68 projecting therefrom eccentric to the shaft 66 to which the driving rod 69 is pivotally connected. It will be seen that when the clutch member 65 is in engagement with the clutch plate 63 and rotated thereby, the action of the eccentric will reciprocate the driving rod 69. The opposite end of the driving rod 69 has the rack bar 70 guided in the housing 71 connected therewith. Said rack bar 70 has teeth meshing with a pinion 72 on the shaft 73. The shaft 73 is provided on the end thereof, opposite the gear 72, with an arm 74 keyed thereto having a pawl 75 pivotally mounted thereon, said pawl being provided with a spring 76 which causes the tooth of the pawl to engage with the ratchet teeth 77 provided on the grooved roller 78. It will be seen that when the shaft 73 is rotated counter-clockwise the pawl 75 will engage with the ratchet teeth 77 and rotate the roller 78 counter-clockwise. This occurs when the rack bar is moving toward the left in Figs. 5 and 6. When the rack bar is moving toward the right in Figs. 5 and 6 the tooth 75 rides over the teeth 77 and no movement of the roller 78 takes place. The clutch mechanism is constructed so that when it operates only a single revolution of the shaft 62 takes place. Thus, one back and forth movement of the rack bar 70 occurs which causes only a partial rotation of the shaft 73 and the feeding forward of the proper amount of solder as will be explained below.

The clutch member 65 is provided with a pin 79 and a lug 80 thereon adapted to enter any one of the grooves 64 opposite said pin 79. The pin 79 is moved toward engaging position with the grooves 64 by means of the compression spring 81 mounted in a bore 82 in the member 65 and engaging with a laterally extending pin 83 provided on said pin 79. The plate 57 is provided with a concave end portion 84 which is provided with a beveled face 85 extending toward the center thereof from the lowermost corner of said plate 57, as shown in Fig. 8, and the pin 79 is provided with a recess 86 for receiving the end portion of said plate 57. The plate 57 will enter the recess 86 when the parts are in the position shown in Figs. 7, 8 and 10 as the pin 79 rotates in a counter-clockwise direction in Fig. 8. As the concave end portion of the plate 57 enters the groove 86, the beveled edge 85 will gradually move the pin 79 to the left in Fig. 10 until the lug 80 is out of engagement with the groove 64 in which the same was seated. When this takes place the rotation of the member 65 stops and no rotation thereof occurs until the member 47 is actuated, due to a pull on the member 43 caused by the can 24 engaging with the member 42, at which time the plate 57 will be withdrawn from the groove 86, due to the same being carried with the member 47 to the right in Fig. 8 and the lug 80 will be projected into a groove 64 by means of the spring 81, thus again causing the clutch member 65 to rotate with the clutch plate 63.

It will be noted that a recess 87 is provided between the members 65 and 67 and that the pin 79 projects into said recess, as will be clear from Fig. 8, the dotted circle in said figure representing the outer wall of the reduced portion 88 provided on the member 67 where the same engages with the member 65 to provide said groove. It will also be noted that the member 47 extends into said recess. Accordingly, as the pin 79 is being carried around in a counter-clockwise direction in Fig. 8, the same engages with the member 47 at the wide end 53 thereof and moves the same away from the member 57, or upwardly in Fig. 8, against the tension of the spring 51. This will cause the member 56 to disengage from the notch 55 and the spring 60 will then retract the member 57. It will, accordingly, be seen that when the pin is rotating with the member 63 the same will operate to re-seat the member 57 immediately so that the end thereof will engage against the outer surface of the member 67 so as to be ready to enter the groove 86 in the pin 79 as soon as the pin rotates a sufficient distance to engage therewith. The member 47 is retracted by the spring 51 as soon as the can moves out of engagement with the member 42 and the locking pin 56 will then again enter the notch or recess 55. Thus, with each actuation of the member 47, by being moved to the right in Fig. 8, the clutch is thrown in and the clutch releasing plate 57 is re-set to a position such that when the pin has made substantially a complete revolution, said plate will again disengage the pin. This causes each actuation of the member 47 to bring about a reciprocation of the rack 72 and actuation of the ratchet through a predetermined distance. The distance that the rack moves, which regulates the amount of rotation given the roller 78 by the ratchet and pawl mechanism, is controlled by means of the adjustment provided in the eccentric 67 which is provided with an under cut groove or slot 89 in which the block 90 provided on the pin 68 is adjustable, the locking member 91 clamping said block in adjusted position. It is evident that the amount of eccentricity of the block 90 governs the degree of movement of the rack with each reciprocation thereof.

Co-operating with the roller 78 is a roll 92 which is also grooved and which is mounted on an eccentric 93, the position of said eccentric being controlled by the arm 94 which is provided with a spring 95 connected with the frame at 96, which tends to move the eccentric to such a position that the roller 92 is moved toward the roller 78, thus yieldingly engaging the wire solder 97 which passes between the rolls in the grooves provided on the same. The solder is mounted on a spool or reel 98 provided on the framework of the machine and passes through a guide tube 99 before entering between the feeding rolls and a similar guide tube 100 which leads to a point closely adjacent the first soldering iron of the series 101, which is grooved as indicated at 102 to receive the solder. The remaining soldering irons 103 are not grooved and are preferably duplicates. It will be noted that said soldering irons are arranged at an oblique angle to the direction of movement of the can 24 and are detachably mounted on the framework by means of the pins 104 entering the keyhole slots 105 in said soldering irons, each soldering iron being secured in place at two points spaced longitudinally of said irons. The irons, due to the oblique arrangement thereof, have the inclined end faces 106 engaging successively with the portion of the can having the seam which is to be soldered and thus act successively to solder the same and provide for more thorough soldering, due to the fact that they will enter any undulations in the material more readily than if a single large soldering iron were used. As will be evident from Fig. 1, the soldering irons are closely adjacent each other and each is heated by means of a gas burner 106 which is arranged as near as possible to the soldering iron which it heats and which is supplied with gas from the pipe 107 controlled by the gas and air valves 108 and 109.

In order to assure that the solder is not in a plastic condition when the can is to be inverted, a blast of cold air is blown on the seam through the air blast 110 after passing the soldering irons. After passing said cold air blast member 110, provided along the upper runway, the guide member 23 terminates and only the guide members 21 and 22 are provided at the extreme left hand end of the machine, as shown in Fig. 1. It will also be noted that the chain 25 does not extend as far as the guide members 21 and 22 and, accordingly, the pusher members 28 will only push the can 24 so far that said pusher members 28 can pass by the same and around the sprocket 27. As the links carrying said pusher members pass around the sprocket 27 the pusher members 28 engage with a finger 111 which is mounted on a pivot 112 provided on the downwardly extending bracket 113 which forms one arm of a bell crank lever, the other arm 114 of which is slotted at 115 and a pin 116 on the stem portion 117 of the ejector member 118 is mounted in said slot. Thus, when the pusher member 28 engages with the member 111, the arm 114 of the bell crank lever is thrown clockwise and the member 118 is raised. As the member 118 is raised, the same tilts the can 24 toward the left in Fig. 3 and causes the same to leave the guide member 21 and drop onto the guideways 119 which lead to the lower runway comprising the guide members 21', 22' and 23'.

The guideways 119 are preferably provided with a facing 124, such as leather, to prevent scratching the can, and have an angle member 125 secured thereto which acts as a fulcrum around which the can turns. The can, in moving from the upper to the lower runways, goes through a tumbling motion, first fulcruming on the corner 126 which causes it to turn one quarter turn and then on the member 125 to cause it to turn the second quarter turn.

When the can 24 reaches said lower guide members 21' and 22' the same will be in a position with the corner, which was in engagement with the guide member 22, upwardly ready to be soldered. The pusher members 28' will then commence the forward movement of the cans in the opposite direction to that along the upper runway, or toward the right in Figs. 1 and 2, and the soldering of the second seam will be done in the same way as described above, the soldering device being identical with those of the first series of devices in the second series and bearing the same numerals.

The member 125 is adjustable, as will be clear from Figs. 2 and 3, wherein the connection comprising the bolts 127 adjustable in the slots 128 is shown for securing the member 125 to the guideways, the adjustment being provided so that the member 125 will be in the proper position to turn over the cans. It will be noted from Fig. 2 that the guideway 21' is cut off and has an upturned end 129 thus preventing interference with the can reaching its proper position on the lower runway.

The beveled shoulder 54 is provided in order to positively limit the movement of the member 57 with the bar 47 to the right in Fig. 8. Thus, when the beveled shoulder 54 engages the corner 130 of the housing 58, said shoulder rides along the said corner and forces the bar 47 outwardly away from the locking bolt 56, thus disengaging the same therefrom, whereupon the plate 57 returns to the position shown in Fig. 8 and the bar 47 is free therefrom, said bar returning to normal position after the can has passed the finger 42.

The solder feeding means is not only adjustable as regards the length of the piece of solder fed to each seam, but also as to the time when feeding commences. This adjustment is made by adjusting the bolts 132 provided on the link 48 in the slot 131 in the rod 43, and by adjusting the pin 45 in the slot 46, thus varying the position of the finger 44. If it is desired to throw the solder feed entirely out of operation the roll 92 is swung on its eccentric on the opposite side of the dead center from that in which it is shown in the drawings, thus spacing the same from the roll 78.

Having thus described my invention, what I desire to claim and secure by United States Letters Patent is:

1. In a can soldering machine, a pair of oppositely extending runways, one of said runways being higher than the other thereof, means for moving cans along said runways in opposite directions, soldering irons and air blast cooling devices arranged successively along said runways, and can operated means for transferring said cans from the upper to the lower runway, said means inverting said cans.

2. In a can soldering machine, a pair of oppositely extending runways for supporting cans with a longitudinally extending corner upward, one of said runways being higher than the other thereof, soldering devices for soldering the seam at said corner, cooling devices adjacent said soldering devices, conveyors for moving said cans along said runways successively into co-operative relation with said soldering devices, said conveyors moving in opposite directions, and means for transferring said cans from the upper to the lower runway and inverting the same with the opposite longitudinally extending corner upward.

3. In a can soldering machine, a pair of oppositely extending runways for supporting cans with a longitudinally extending corner upward, one of said runways being higher than the other thereof, soldering devices for soldering the seam at said corner, cooling devices adjacent said soldering devices, conveyors for moving said cans along said runways successively into co-operative relation with said soldering devices, said conveyors moving in opposite directions, and means for transferring said cans from the upper to the lower runway and inverting the same with the opposite longitudinally extending corner upward, said means comprising a can operated member for discharging said cans from said upper runway and a guideway for directing the cans onto said lower runway.

In witness whereof, I hereunto subscribe my name this 17th day of Sept. A. D., 1923.

CARL STEEN.